(12) United States Patent
Satterfield et al.

(10) Patent No.: US 7,774,259 B1
(45) Date of Patent: Aug. 10, 2010

(54) INTERACTIVE WAGERING SYSTEM WITH CRITERIA WAGERING

(75) Inventors: Kevin D. Satterfield, Tulsa, OK (US); Connie T. Marshall, Muskogee, OK (US); Jon C. Zaring, Tulsa, OK (US)

(73) Assignee: ODS Properties, Inc., Los Angeles, CA (US)

( * ) Notice: Subject to any disclaimer, the term of this patent is extended or adjusted under 35 U.S.C. 154(b) by 0 days.

(21) Appl. No.: 09/516,428

(22) Filed: Mar. 1, 2000

(51) Int. Cl.
*G06Q 99/00* (2006.01)

(52) U.S. Cl. .............................. 705/37; 463/40; 463/42; 463/25

(58) Field of Classification Search ................... 463/40, 463/42, 25; 705/37
See application file for complete search history.

(56) References Cited

U.S. PATENT DOCUMENTS

| | | | | |
|---|---|---|---|---|
| 4,322,612 A | * | 3/1982 | Lange et al. | 235/419 |
| 4,467,424 A | * | 8/1984 | Hedges et al. | 346/412 |
| 5,830,067 A | * | 11/1998 | Graves et al. | 463/40 |
| 6,099,409 A | * | 8/2000 | Brenner et al. | 463/40 |
| 6,117,011 A | * | 9/2000 | Lvov et al. | 463/25 |

FOREIGN PATENT DOCUMENTS

| | | | |
|---|---|---|---|
| EP | 0 387 046 A2 | | 9/1990 |
| EP | 0 583 196 A1 | | 2/1994 |
| EP | 0 620 688 A2 | | 10/1994 |
| EP | 0 624 039 A2 | | 11/1994 |
| EP | 0 673 004 A2 | | 9/1995 |
| EP | 0 873 772 A1 | | 10/1998 |
| EP | 0 934 765 A1 | | 8/1999 |
| GB | 2 300 535 A | | 11/1996 |
| GB | 2304217 A | * | 3/1997 |
| JP | 01-25659 | | 1/1989 |
| JP | 01-269157 | | 10/1989 |
| JP | 02-110660 | | 4/1990 |
| JP | 02-231671 | | 9/1990 |
| JP | 06-325062 | | 11/1994 |
| WO | WO 95/01058 | | 1/1995 |
| WO | WO 95/30944 | | 11/1995 |
| WO | WO 97/13368 A1 | | 4/1997 |
| WO | WO 97/19428 | | 5/1997 |

OTHER PUBLICATIONS

The Boulder County Business Report; Feb. 1998; By Beth Potter; Horse racing network bets on interactive TV.*
Daily Digest; Virginian—Piolt; Norfolk, Va. Jun. 22, 1995.*
The Washington Post; In the Race for the Home Betting Market, Tracks Are Being Left at the Gate.*

(Continued)

*Primary Examiner*—Akiba K Robinson Boyce
(74) *Attorney, Agent, or Firm*—Ropes & Gray LLP

(57) ABSTRACT

An interactive wagering application is provided that allows users to establish wagering criteria. When the wagering application detects that a wagering opportunity is available that satisfies the user's selected criteria, the wagering application may take an appropriate action. The wagering application may, for example, automatically place a wager or may notify a user that the criteria have been satisfied. Wagering criteria may be based on a particular track, horse, jockey, trainer, racetrack surface, race distance, statistics, jockey silks, odds or changes in odds, etc.

65 Claims, 10 Drawing Sheets

OTHER PUBLICATIONS

John Burgess, "And We're Off To The Races!" Jan. 16, 1995, pp. 18-19, The Washington Post.

Maury Wolff, "Interactive Wagering A Good Bet," Jan. 29, 1995, p. 4, Daily Racing Form.

Ross Peddicord, "New on TV: You Bet Your Horse," Dec. 15, 1994, The Sun, Baltimore, Maryland.

Yee-Hsiang Chang et al., "An Open-Systems Approach to Video on Demand," May 1994, pp. 68-80, IEEE Communications Magazine.

TrackMaster User's Guide Version 2.0.7, Apr. 1994, pp. 1-122, AXCIS Pocket Information Network, Inc., Santa Clara, California.

Tiny Tim Brochure, AutoTote Systems Inc., Newark, Delaware (undated).

Probe XL Brochure, pp. 1-21, AutoTote Systems, Inc., Newark, Delaware (undated).

* cited by examiner

INTERACTIVE WAGERING SYSTEM WITH CRITERIA WAGERING

BACKGROUND OF THE INVENTION

This invention relates to interactive wagering, and more particularly, to interactive wagering applications that allow wagering criteria to be established by users. When a wagering opportunity arises that satisfies the user's criteria, the application may automatically place a wager, notify the user, or take other appropriate actions.

Wagering is a popular leisure activity. For example, many racing fans wager on events such as horse, dog, and harness racing. However, it may be inconvenient to attend racing events in person. Not all racing fans have sufficient time to visit racetracks as often as they would like and some fans have difficulties in obtaining suitable transportation to the track. Off-track betting establishments are available for fans who cannot attend racing events in person, but fans must still travel to the off-track betting establishments.

As a result, systems have been developed in which fans may place off-track wagers using personal computers connected to the Internet, standard telephones, or set-top boxes.

It is an object of the present invention to improve such systems by providing an interactive wagering system that allows users to set various wagering criteria. When the criteria are satisfied, certain selected actions may be taken by the system.

SUMMARY OF THE INVENTION

This and other objects of the invention are accomplished in accordance with the principles of the present invention by providing an interactive wagering system in which an interactive wagering application may provide a user with an opportunity to establish various wagering criteria. When a wagering opportunity becomes available that satisfies the user's criteria, the wagering application may take an appropriate action.

Wagering criteria may include any suitable wagering-related parameters, such as a particular track, horse, jockey, trainer, track surface, race distance, silks (jockey colors), type of race (e.g., claiming, states, etc.), odds or changes in odds, class ratings, gate position, purse amount, claim amount, weather conditions, etc. Users may select the criteria and multiple criteria may be established. For example, a user may desire to automatically place a wager or be notified of a wagering opportunity whenever the horse "Cat Thief" is running and the jockey is "Pat Day."

The wagering application may determine when the wagering criteria are satisfied by comparing the wagering criteria to the racing data provided to the wagering application by a transaction processing and subscription management system or other suitable equipment in the wagering system.

Various actions may be taken when the wagering criteria are satisfied. For example, the interactive wagering application may automatically place a wager. The user may select a desired wager type and a desired wager amount for such automatic wagers. Multiple sets of wagering criteria may be established, each of which has a different associated action.

The wagering application may alert the user when the wagering criteria have been satisfied, so that the user may decide whether to place a wager. The user may also be notified whenever a wager is placed automatically. Such notifications or confirmations may be used to alert the user to the automatic wagering activity.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
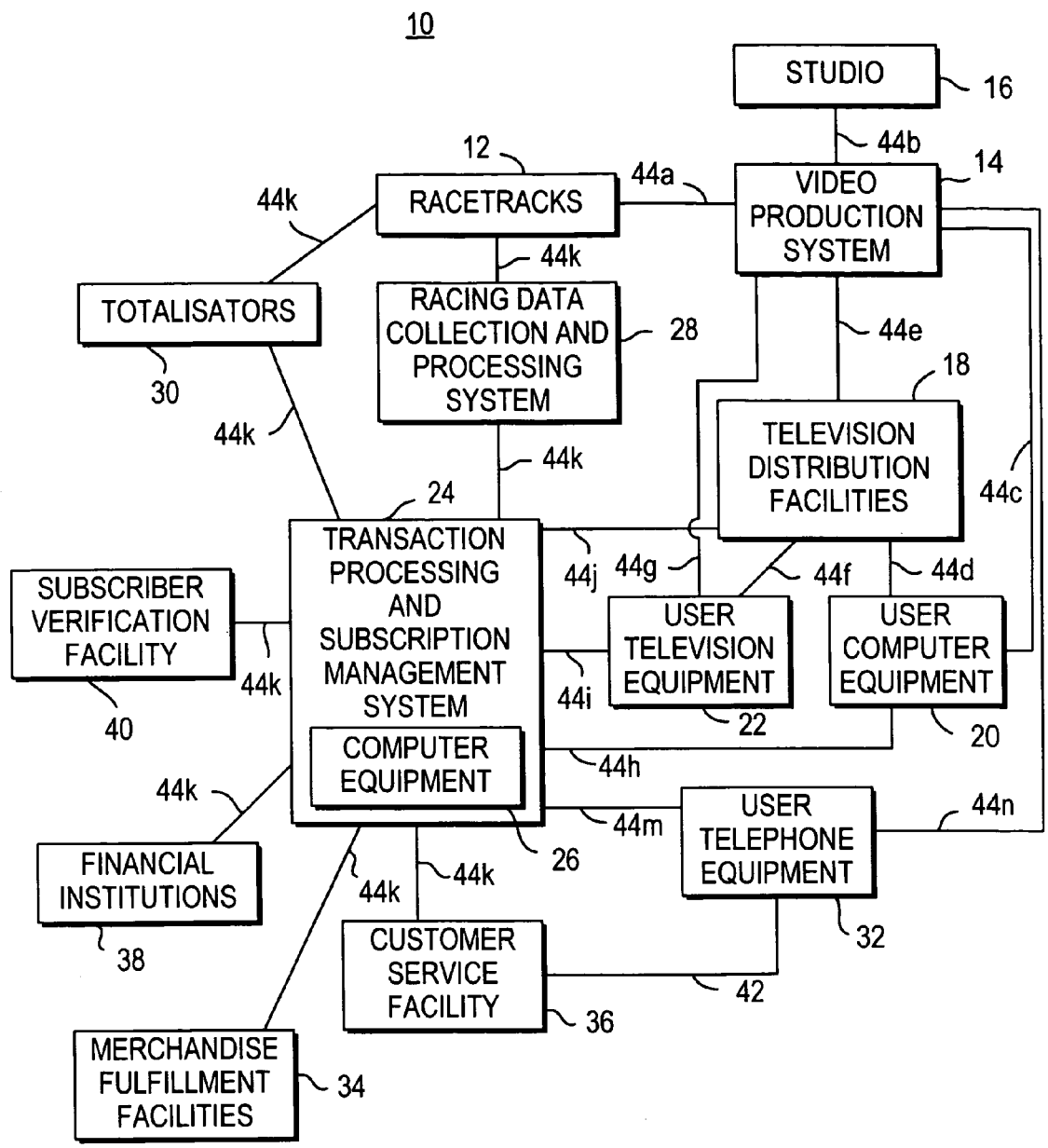
FIG. 1 is a schematic diagram of an illustrative interactive wagering system on which an interactive wagering application may be implemented in accordance with the present invention.

An illustrative interactive wagering system 10 in accordance with the present invention is shown in FIG. 1. Aspects of the invention apply to various different types of wagering, but are described herein primarily in the context of interactive wagering on races (e.g., horse races) for specificity and clarity.

Races may be run at racetracks 12, which may be located at various geographic locations. Races run at the racetracks may be simulcast to television viewers. For example, simulcast videos may be provided to users with satellite receivers or to off-track betting establishments via satellite.

System 10 may be used to provide an interactive wagering service to users of various user equipment. An interactive wagering application may be used to provide the wagering service. The interactive wagering application may run locally on the user equipment (e.g., on a set-top box, personal computer, cellular telephone, handheld computing device, etc.) or may run using a client-server or distributed architecture where some of the application is implemented locally on the user equipment in the form of a client process and some of the application is implemented at a remote location (e.g., on a server computer or other such equipment in the system) as a server process. These arrangements are merely illustrative. Other suitable techniques for implementing the interactive wagering application may be used if desired.

Real-time videos from racetracks 12 may also be provided to video production system 14 for distribution to users as part of a television wagering service (i.e., a wagering-related television channel or Internet-delivered service or the like). If desired, multiple simulcast videos may be provided to video production system 14 in real-time. Talent (e.g., commentators) for the television wagering service provided by the interactive wagering application may be located at studio 16. Studio 16 may provide a video feed containing commentary and the like to video production system 14. Graphic overlays for the television wagering service may be added to the service at video production system 14.

The television wagering service may use video production system 14 to combine selected video segments from desired racing simulcasts with the video feed from studio 16 and suitable graphic overlays. If desired, video production system 14 or a separate facility may be used to reformat simulcasts from racetracks 12. For example, if racetracks 12 provide simulcasts as traditional analog television channels, video production system 14 (or a separate facility) may convert these simulcasts or portions of these simulcasts into digital signals (e.g., digital video signals) or into a different number of analog signals. Digital video signals may require less bandwidth than analog video signals and may be appropriate for situations in which videos are to be transmitted over either high or low bandwidth pathways. Low bandwidth pathways may include telephone lines, the Internet, etc.

Video production system 14 may be used to provide a television wagering service that includes selected simulcast videos, video from studio 16, and graphic overlays to television distribution facilities 18 (for redistribution to user television equipment 22 and user computer equipment 20), to user computer equipment 20, and to user telephone equipment 32 (if user telephone equipment 32 has a display capable of displaying moving images). Television distribution facilities 18 may be any suitable facilities for supplying television to users, such as cable system headends, satellite systems, broadcast television systems, or other suitable systems or combinations of such systems. User computer equipment 20 may be any suitable computer equipment that supports an interactive wagering application. For example, user computer equipment 20 may be a personal computer. User computer equipment 20 may also be based on a mainframe computer, a workstation, a networked computer or computers, a laptop computer, a notebook computer, a handheld computing device such as a personal digital assistant or other small portable computer, etc.

Each of television distribution facilities 18 is typically located at a different geographic location. Users with user television equipment 22 may receive the television wagering service from an associated television distribution facility. User television equipment 22 may include, for example, a television or other suitable monitor. A television may be used to watch the television wagering service on a traditional analog television channel. User television equipment 22 may also include a digital or analog set-top box connected to a television distribution facility 18 by a cable path. A digital set-top box may be used to receive the television wagering service on a digital channel. If desired, user television equipment 22 may contain a satellite receiver, a WebTV box, a personal computer television (PC/TV), or hardware similar to such devices into which set-top box capabilities have been integrated. A recording device such as a videocassette recorder or digital recording device (e.g., a personal video recorder or digital video recorder based on hard disk drives or the like) may be used in user television equipment 22 to store videos. The recording device may be separate from or part of the other components of user television equipment 22.

User computer equipment 20 may receive the television wagering service using a video card or other video-capable equipment to receive analog or digital (e.g., moving picture experts group or MPEG) videos from a television distribution facility. User computer equipment 20 may also receive the television wagering service directly from video production system 14 using, for example, a modem link. If desired, the video for the television wagering service may be compressed (e.g., using MPEG techniques). This may be useful, for example, if the path to user computer equipment 20 is a modem connection using telephone links. If video production system 14 is only used to serve user computer equipment 20 without traditional analog television capabilities, video production system 14 may only need to supply such digitally-compressed video signals and not analog television signals.

Video clips of races and other simulcast information may be provided to users in the form of a television wagering service or by an interactive wagering service provided by the interactive wagering application. If desired, race-related videos may be provided to the user by using video production system 14 or other suitable equipment to route appropriate video clips from the simulcasts to the user in real time. Video clips may also be stored for later viewing. For example, one or more video servers located at racetracks 12, video production system 14, television distribution facilities 18, or other suitable locations may be used to store video clips. The stored videos may then be played back in real time or downloaded for viewing at user television equipment 22, user computer equipment 20, or user telephone equipment 32. The video clips may contain videos of races, commentary, interviews with jockeys, or any other suitable race-related information. If desired, real-time or stored videos may be provided from racetracks 12 directly to user television equipment 22, user computer equipment 20, or user telephone equipment 32 over the Internet or other suitable communications paths without involving video production system 14. Videos may also be provided by routing video signals through equipment located elsewhere in system 10. For example, videos may be routed through transaction processing and subscription management system 24.

Transaction processing and subscription management system 24 may contain computer equipment 26 and other equipment for supporting system functions such as transaction processing (e.g., handling tasks related to wagers, product purchasing, adjusting the amount of funds in user accounts based on the outcomes of wagers, video clip ordering, etc.), data distribution (e.g., for distributing racing data to the users), and subscriber management (e.g., features related to opening an account for a user, closing an account, allowing a user to add or withdraw funds from an account, changing the user's address or personal identification number, etc.). Databases within transaction processing and subscription management system 24 or associated with system 24 may be used to store racing data, wagering data and other transaction data, and subscriber data such as such as information on the user's current account balance, past wagering history, individual wager limits, personal identification number, billing addresses, credit card numbers, bank account numbers, social security numbers, etc. Using such databases may allow the user to access information more quickly and allows for central administration of the wagering service.

If desired, racing videos and other services may be provided using servers and other equipment located at transaction processing and subscription management system 24. For example, video clips may be provided to the user on-demand. Interactive advertisements may be provided to the user. When the user selects a desired advertisement, transaction processing and subscription management system 24 may provide additional information or other services related to the advertisement to the user.

Product ordering services may be implemented using computer equipment at transaction processing and subscriber management system 24 to handle orders and to assist in adjusting the appropriate account of the user accordingly. Orders may be fulfilled using merchandise fulfillment facilities 34. Merchandise fulfillment facilities 34 may be operated solely to provide merchandise fulfillment or may be associated with independently-operated mail-order or on-line businesses. Similar facilities may be used to allow users to order services.

Statistical racing data such as the post times for each race, jockey names, runner names and the number of races associated with each track, handicapping information (e.g., information on past performances such as the number of wins and losses for the past year, etc.), and weather conditions at various tracks may be provided by racing data collection and processing system 28. Some of the data may be collected from racetracks 12 and some may be provided by third party information sources such as Axcis Pocket Information Network, Inc. of Santa Clara, Calif. or other suitable data sources.

Racing data may also be provided from totalisators 30. Totalisators 30 are the computer systems that may be used to handle wagers made at the racetracks, made at off-track betting establishments, and made using interactive wagering system 10. Totalisators 30 generate wagering odds in real time. Totalisators 30 generate these odds based on information on which wagers are being placed (e.g., based on information on which wagers are being placed on races at racetracks 12). Totalisators 30 are available from companies such as Amtote International, Inc. of Hunt Valley, Md. Totalisators 30 may be associated with individual racetracks 12 or groups of racetracks 12. Totalisators 30 may communicate with one another using a communication protocol known as the Intertote Track System Protocol (ITSP). This allows totalisators 30 to share wagering pools. Totalisators 30 may provide racing data including information on the current races at racetracks 12, the number of races associated with each racetrack, win, place, and show odds and pool totals for each horse or other runner, and exacta, trifecta, and quinella payoff predictions and pool totals for every possible combination of runners. Totalisators 30 may also provide current odds and other real-time racing data for other types of wagers. Totalisators 30 may provide the time until post time for each race.

Totalisators 30 may provide race results, such as the order-of-finish list for at least the first three positions and payoff values versus a standard wager amount for win, place, and show, for each runner in the finish list. Payoff values may be provided for winning complex wager types such as exacta, trifecta, quinella, pick-n (where n is the number of races involved in the pick-n wager), and daily double. The payoff values may be accompanied by a synopsis of the associated finish list.

Totalisators 30 may also provide program information of the type typically provided in printed racing programs. Such program information may include early odds, early scratches, race descriptions (including the distance of each race and the race surface—grass, dirt, artificial turf, etc.), allowed class ratings (based on a fixed ratio of external criteria), purse value (payoff to winning runner), allowed age range of runners, and the allowed number of wins and starts for each runner.

If desired, some of the information provided to transaction processing and subscription management system 24 by totalisators 30 (such as the program information or other suitable racing data) may be provided by racing data collection and processing system 28. Similarly, some of the information provided to transaction processing and subscription management system 24 by racing data collection and processing system 28 may be provided by totalisators 30. Moreover, the foregoing examples of different suitable types of racing data are merely illustrative. Any suitable data related to racing may be provided to transaction processing and subscription management system 24 if desired.

Transaction processing and subscription management system 24 provides the racing data to users at user television equipment 22, user computer equipment 20, and user telephone equipment 32 for use in following race results and developing wagers. If desired, racing data may be provided to users using paths that do not directly involve transaction processing and subscription management system 24. For example, racing data may be provided from racing data collection and processing system 28 to user television equipment 22, user computer equipment 20, or user telephone equipment 32 using the Internet or other suitable communications paths.

User telephone equipment 32 may be a conventional telephone, a cordless telephone, a cellular telephone or other portable wireless telephone, or any other suitable telephone equipment. Users at user television equipment 22 and user computer equipment 20 may view information on the racing data on a television or other suitable monitor. Users at user telephone equipment 32 may listen to racing data using an interactive voice system. User telephone equipment 32 may be based on cellular telephones with displays. Users may view racing data displayed on such displays.

Users who wish to place wagers may establish an account at transaction processing and subscription management system 24. An account may also be established at one of totalisators 30. The user and the interactive wagering services may have their own bank accounts at financial institutions 38. A user may set up an account electronically by using user television equipment 22, user computer equipment 20, or user telephone equipment 32 to interact with the subscriber management functions of transaction processing and subscription management system 24. If desired, accounts may be established with the interactive wagering service with the assistance of customer service representatives at customer service facility 36. Customer service facility 36 may be at the same location as transaction processing and subscription management system 24, may be part of system 24, or may be located remote from system 24. Customer service representatives at customer service facility 36 may be reached by telephone. If user telephone equipment 32 is used to access the interactive wagering service, for example, user telephone equipment 32 may be used to reach the customer service representative using communications path 42. If user television equipment 22 or user computer equipment 20 is being used with the service, a telephone at the same location as that equipment may be used to reach the customer service representative.

The user's identity may be checked using social security number information or other identification information with the assistance of subscriber verification facility 40. The services of subscriber verification facility 40 are used to ensure that the user lives in a geographic area in which wagering is legal, that the user is of a legal age, and that the identification information (e.g., the user's social security number) matches the name provided by the user. If the user is using a cellular telephone or handheld computing device, the user's present physical location may be determined by determining which general part of the cellular telephone network is being accessed by the user or by using the cellular network or a handset-based location device such as a global positioning system (GPS) receiver in the body of the cellular telephone to pinpoint the user's location. This location information may be used to verify that the user is located in a geographic area where wagering is legal.

In a typical enrollment process, the user provides personal information to the interactive wagering service and provides funds with a credit card or funds from the user's bank account. The interactive wagering service sets up an account for the user at transaction processing and subscription management system 24 and directs one of totalisators 30 to set up a new account for the user at the totalisator. The totalisator is also directed to credit the user's account to reflect the amount of funds provided by the user. After the user places a wager and wins or loses, the totalisator adjusts the user's totalisator account to reflect the outcome of the wager. The totalisator may periodically inform the interactive wagering service of the adjusted balance in the user's account. This may be accomplished using any suitable technique (e.g., periodically, continuously, on-request, etc.). For example, reports may be collected periodically (e.g., once a day in an end-of-day report) and provided to the interactive wagering service to reconcile the account balances at transaction processing and subscription management system 24 with the account balances at totalisators 30.

If the user makes a balance inquiry, the inquiry may be passed to the appropriate totalisator by transaction processing and subscription management system 24. If the user is charged a fee for subscribing to the service, the service may debit the fee from the user's account at the transaction processing and subscription management system 24.

The accounts at totalisators 30 and transaction processing and subscription management system 24 are typically maintained separately, because the business entities that operate totalisators 30 and transaction processing and subscription management system 24 are independent. If desired, financial functions related to opening and maintaining user accounts and the like may be handled using computer equipment at another location such as one of financial institutions 38 or other location remote from totalisators 30 and system 24. Such financial functions may also be implemented primarily at a totalisator 30 or primarily at the transaction processing and subscription management system 24 if desired.

Users at user television equipment 22, user computer equipment 20, and user telephone equipment 32 may place wagers by providing wagering data and otherwise interacting with transaction processing and subscription management system 24. The interactive wagering service may provide a user at user television equipment 22, user computer equipment 20, or user telephone equipment 32 that has display capabilities with screens containing various racing data. For example, the user may be presented with screens that allow the user to view the current odds for horses in an upcoming race at a given track.

The service may provide the user with interactive screens containing menus and selectable options that allow the user to specify the type of wager in which the user is interested and the desired wager amount. With a set-top box arrangement, for example, the user may use a remote control or wireless keyboard to navigate the various menus and selectable options. With a personal computer, the user may use a keyboard, mouse, trackball, touch pad, or other suitable input or pointing device. With a cellular telephone with a display, the user may use buttons on the telephone. When the user has made appropriate selections to define a desired wager, the user television equipment, user computer equipment, or user telephone equipment may transmit wagering data for the wager to transaction processing and subscription management system 24.

Users with telephones may also interact with the service using an interactive voice response system located at transaction processing and subscription management system 24. The interactive voice response system may present menu options to the user in the form of audio prompts (e.g., "press 1 to select a $2 wager amount," etc.). The user may interact with the service be pressing the corresponding buttons on a touch tone telephone. User telephone equipment 32 that is based on cellular telephones allows the user to interact with the wagering service in this way. User telephone equipment 32 that is based on cellular telephones with messaging and display capabilities also allows the user to interact visually with the interactive wagering service.

The components of system 10 may be interconnected using various communications paths 44. Communications paths 44 may include satellite paths, coaxial cable paths, fiber-optic paths, twisted pair paths, other wire or cable-based links, wireless paths through free space, or any other suitable paths or combination of such paths. Communications over paths 44 may involve analog transmissions, digital transmissions, wireless transmissions, microwave transmissions, radio-frequency transmissions, optical transmissions, audio transmissions, or any other suitable type of transmissions or combination of such transmissions. Communications may involve Internet transmissions, private network transmissions, packet-based transmissions, television channel transmissions, transmissions in the vertical blanking interval of a television channel or on a television sideband, MPEG transmissions, etc. Communications may involve wireless pager or other messaging transmissions. Communications paths 44 may include cable connected to cable modems, digital subscriber lines, integrated services digital network (ISDN) lines, or any other suitable paths. Examples of suitable communications paths are described below. Those examples are, however, merely illustrative. Any of the communications path arrangements described above or other suitable arrangements may be used if desired.

Communications paths that carry video and particularly uncompressed analog video or lightly-compressed or full-screen digital video generally use more bandwidth than communications paths that carry only data or that carry partial-screen digital video. For example, if it is desired to transmit high-quality simulcasts of races from racetracks 12 to video production system 14, analog or digital videos may be transmitted from racetracks 12 to video production system 14 over path 44*a* using satellite links. Video may be transmitted from studio 16 to video production system 14 over path 44*b* using a satellite link or a high-speed terrestrial path such as a fiber-optic path. Studio 16 may also be located at the same site as video production system 14, thereby avoiding the need for a long-haul transmission path. Videos may be transmitted from video production system 14 to user computer equipment 20 over path 14*c* using a modem link (using, for example, a digital subscriber line, a telephone network link, a wireless link etc.) The modem link may be made over a private network.

A user with a cable modem may connect a personal computer or other such user computer equipment 20 to an associated cable system headend using path 44*d*. (The headend in such an arrangement would be one of the television distribution facilities 18 shown in FIG. 1.) The user may then receive videos from the headend via cable modem. Videos may be provided to the headend over path 44*e* using a network link, fiber optic links, cable links, microwave links, satellite links, etc. A user with a set-top box or similar device (shown in FIG. 1 as user television equipment 22) may also receive videos from a cable system headend using a cable modem or other such communications device over path 44*f*. In addition, a user with user television equipment may receive videos over the Internet or a private network using a telephone-based modem or other such communications device using path 44*g*. In a system with distributed processing, interactive wagering services may be provided using a television distribution facility 18 that includes equipment that supplements or replaces at least some of the equipment at transaction processing and subscription management system 24.

If desired, user television equipment 22 or user computer equipment 20 may receive analog or digital videos from an associated television distribution facility over the communications paths normally used to distribute television programming (e.g., paths 44*f* and 44*d*). For example, videos may be received as part of a dedicated interactive wagering service television channel. If videos are provided as digital signals (e.g., MPEG signals), 10 or more digital videos may be carried on a single analog channel (or one digital video may be carried on one-tenth of the bandwidth of an analog channel). If the videos are not full-screen videos, even more videos may be simultaneously provided without a loss of image quality.

Racing videos may be provided to user telephone equipment 32 over a partially-wireless telephone Internet link or other telephone link using path 44*n*.

If desired, racing data may accompany the racing videos along any of these paths. Moreover, racing videos may be provided by routing them directly from racetracks 12 to user television equipment 22, user computer equipment 20 (e.g., over the Internet or a private network, etc.), or user telephone equipment 32. Racing videos may also be provided by routing them through transaction processing and subscription management system 24. If a cellular telephone or portable computing device has sufficient display capabilities to support moving images, racing videos may be displayed. Such videos may be provided using any suitable path, such as a direct path from racetracks 12, a path through video production system 14 or other suitable video processing equipment, through a hub such as transaction processing and subscription management system 24, etc. Racing videos may be provided in real time or may be recorded for later distribution. Videos that are not provided in real-time may be downloaded by user television equipment 22, user computer equipment 20, a cellular telephone, or other suitable user equipment at a lower data rate than would otherwise be required and may be downloaded in the background if desired. Such videos may also be provided to the user at real-time video rates for direct viewing by the user.

Racing data and other information related to the interactive wagering service may be provided to users over paths connected to transaction processing and subscription management system 24. For example, racing data and other data for the service may be provided to user computer equipment 20 over path 44*h* using a modem link. Path 44*h* may be a private network path or an Internet path. Path 44*h* may use telephone lines, digital subscriber lines, ISDN lines, wireless data paths, or any other suitable type of communications links. User television equipment 22 may receive data for the wagering service over communications path 44*i*, which may be a telephone line, digital subscriber line, ISDN line, or other suitable type of communications path and which may use a private network path or an Internet path, etc.

Data for the wagering service may be provided to users of the interactive wagering application via communications path 44*j* and paths 44*f* and 44*d*. Communications path 44*j* may be provided over a private network, using the public telephone network, using satellite links, or any other suitable type of links. Data from paths such as path 44*j* may be routed to paths such as paths 44*f* and 44*d* directly by associated television distribution facilities 18, or may be buffered at television distribution facilities 18 if desired. Paths 44*f* and 44*d* may include coaxial cable and use of paths 44*f* and 44*d* may involve the use of cable modems or the like. If data is provided over path 44*j* and path 44*f* or path 44*d* using an Internet protocol, a web browser or similar software running on user television equipment 22 or user computer equipment 20 may be used to access the data. Such software may be integrated into the interactive wagering application or may be used separately. Software may also be used to view videos and may be used on other platforms (e.g., advanced cellular telephones) if desired.

The communications paths 44*k* that are used to connect various other components of the system typically do not carry high-bandwidth video signals. Accordingly, paths 44*k* may be telephone-like paths that are part of the Internet or a private network. Such paths and various other paths 44 may be dedicated connections for security, reliability, and economy.

User telephone equipment 32 may receive information for the wagering service via path 44*m*. If user telephone equipment 32 is a standard (non-cellular) telephone, such information may be in the form of audio prompts ("press 1 to place a wager") and audio racing data ("the current win odds for horse 2 are 5-1"). Transaction data processing and subscription management system 24 may contain interactive voice response equipment that provides such information to the user and that responds to touch-tone signals from the user when the user responds to prompts by pressing buttons on the user's telephone.

If user telephone equipment 32 is a cellular telephone, racing data and other information for the interactive wagering service may be provided to the user by using a cellular wireless connection as part of path 44*m*. Users with cellular telephones may be provided with audio prompts using an interactive voice response system located at transaction processing and subscription management system 24 to which the users may respond by pressing cellular telephone buttons to generate touch-tone signals.

Racing data and other information for the interactive wagering service may be provided to cellular telephones in the form of alphanumeric messages. Such messages may be transmitted to the user by using paging or other alphanumeric messaging formats or any other suitable data communications scheme. If desired, data may be provided to the cellular telephones over the voice channel and decoded by the cellular telephone using modem circuitry or other suitable circuitry. Data may also be provided using any other suitable cellular or wireless path. Regardless of the way in which racing data and other information for the interactive wagering service are provided to the cellular telephone, such information may be provided to the user by displaying it on the cellular telephone display screen or by presenting it in audible form through the speaker of the cellular telephone.

Racing data and other interactive wagering service information for the users may be provided in one or more continuous data streams, may be provided periodically (e.g., once per hour or once per day), or may be provided using a client-server arrangement in which data is requested by a client processor (e.g., user television equipment 22, user computer equipment 20, user telephone equipment 32, or any other such equipment) from a server (e.g., a server implemented using computer equipment 26 at transaction processing and subscription management system 24 or computer equipment at another suitable location). Videos may also be provided using any of these techniques.

A return communications path between the user and the interactive wagering service may be used to allow the user to place wagers and otherwise interact with the interactive wagering service. For example, a user with a standard telephone or a cellular telephone may interact with the service by pressing touch-tone keys on the telephone in response to audio prompts provided by an interactive voice response system at transaction processing and subscription management system 24. If desired, users may call customer service representatives at customer service facility 36 and place wagers with manual assistance. The user of a cellular telephone may interact with the wagering service by selecting menu options and otherwise interacting with information displayed on the cellular telephone. When a selection is made, software implemented on the telephone may be used to assist the user in transmitting appropriate data (e.g., wagering data) to the wagering service. Such data may be transmitted using any suitable technique. For example, data may be transmitted using a wireless data link that is separate from the cellular voice channels. Data may also be transmitted over the voice channel (e.g., using a modem built into the cellular telephone, by automatically generating touch-tone signals that may be recognized by the interactive voice response system at transaction processing and subscription management system 24, or using any other suitable arrangement). These approaches may be used even if the user receives racing data and other information for the service using a platform other than a telephone-based platform.

Users with user television equipment 22 may interact with the service by sending data (e.g., wager data) to transaction processing and subscription management system 24 using path 44i or using paths 44f and 44j. Users with user computer equipment 20 may send data (e.g., wager data) to transaction processing and subscription management system 24 via path 44h or paths 44d and 44j. Users at any user equipment may send data for the service to locations other than transaction processing and subscription management system 24. For example, the user may provide information directly to customer service facility 36, etc.

If desired, the user may send data to the service at transaction processing and subscription management system 24 using different paths than those used to receive data from transaction processing and subscription management system 24. For example, racing data may be received at user television equipment 22 via paths 44j and 44f, whereas data may be sent by the user from user television equipment 22 to transaction processing and subscription management system 24 using path 44i, etc. Moreover, the paths used to receive certain video information may be different from those used to receive racing data. For example, user television equipment 22 may receive racing videos using path 44f, but may receive racing data using path 44i. These examples are merely illustrative.

Any suitable combination of paths may be used to distribute racing data and other information for the interactive wagering service, any suitable combination of paths may be used to receive videos, and any suitable combination of paths may be used to send data to the wagering service.

If desired, the user may interact with the wagering service using more than one platform. For example, the user may place a wager using a cellular telephone while the user is driving home. When the user arrives home, the user may determine the outcome of the wager by watching a video of the race on user television equipment. Later in the day, the user may check the user's account balance using a personal computer. This is merely an illustrative example. The various wagering platforms may be used in any suitable combination.

Although system 10 has been described in the context of a system that supports multiple wagering platforms, system 10 may support fewer platforms if desired. For example, aspects of the invention may be implemented using a system 10 that only supports cellular telephone wagering or wagering using handheld computer devices. If desired, system 10 may be configured so that it does not support personal computer wagering, wagering with standard telephones, or wagering with user television equipment. The system may support cellular telephones and/or handheld computing devices such as personal digital assistants, palm-sized computers, etc. in combination with any other suitable platform.

The criteria wagering features of the present invention are described herein primarily in the context of an interactive wagering application implemented on user television equipment such as a set-top box. This is only illustrative. An interactive wagering application implemented on any suitable platform (user computer equipment, user telephone equipment, etc.) may be used to provide such features if desired.

The interactive wagering application may be implemented using application software that runs primarily on a set-top box or other such local platform or using a remote server or other computer that is accessed from a local platform. Arrangements in which interactive wagering services are implemented using software on remote computers that is accessed on-demand from local platforms may be referred to as client-server arrangements. Such client-server arrangements may be used to allow client processes on set-top boxes to access server processes running on servers located at cable system headends or other television distribution facilities 18 (FIG. 1). Regardless of the type of system architecture or platform used, the software that supports the interactive wagering service features described herein may be referred to as an interactive wagering application.

Figure 2:
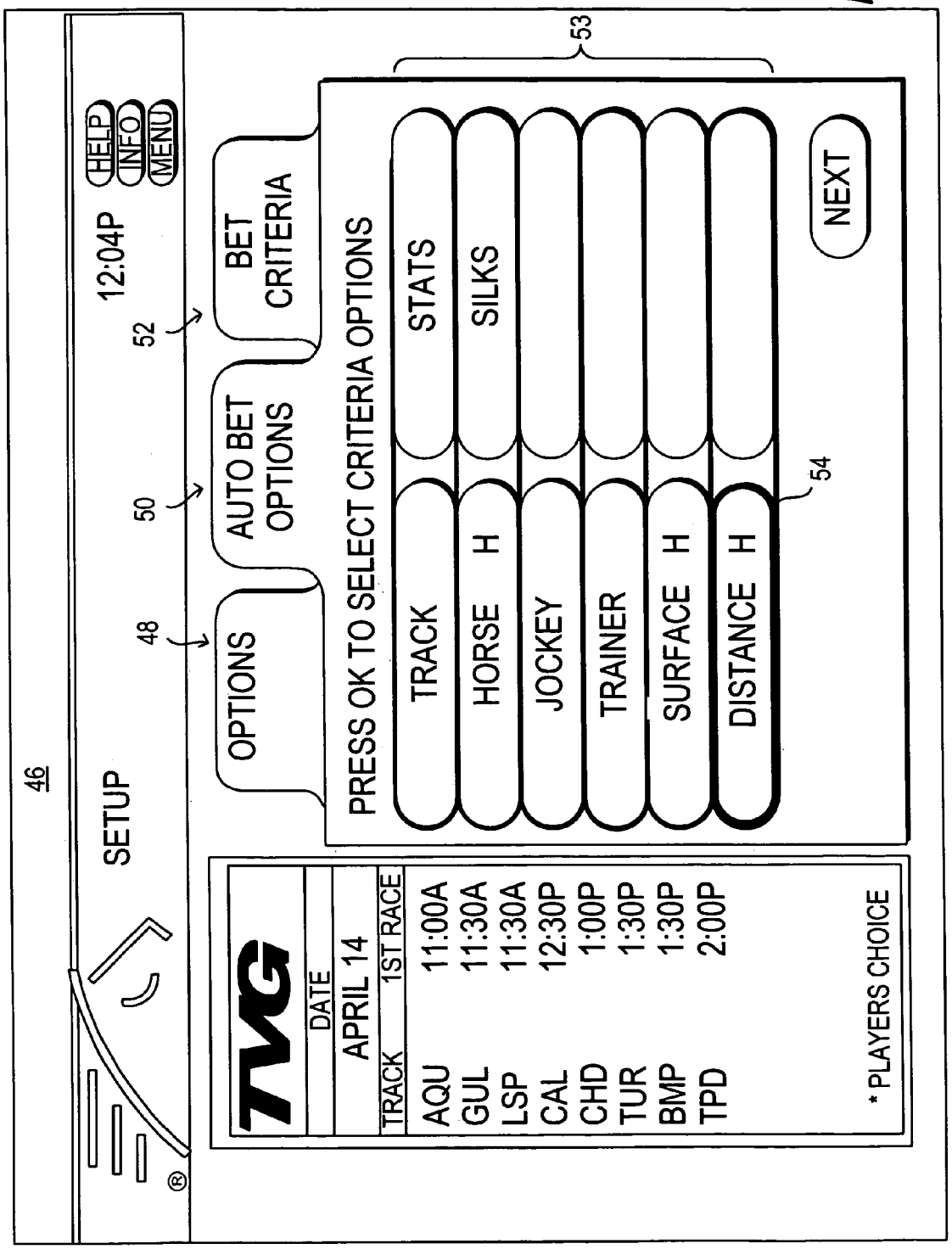
FIG. 2 is an illustrative display screen that the interactive wagering application may display to provide a user with an opportunity to select various types of desired wagering criteria that are to be used to identify wagering opportunities of interest in accordance with the present invention.

An illustrative display screen that may be provided by the interactive wagering application is shown in FIG. 2. Screens such as screen 46 of FIG. 2 may be accessed in a variety of ways. A user may initially be provided with an opportunity to launch the interactive wagering application. The system may allow the user to launch the application by pressing a menu option in an interactive television program guide or other set-top box application or menu. If desired, the application may be launched automatically whenever the user tunes to a particular channel (e.g., the television wagering channel). After the user has tuned to this channel, the system may display an interactive icon on the user's television screen that indicates that the interactive wagering application is available. If the user presses an "OK" remote control key, the system may launch the application.

The first screen displayed by the interactive wagering application when it is launched may be a pop-up menu that is displayed on top of the video for the television wagering channel. The menu may contain menu options that allow the user to inform the application that the user wishes to configure the system, to place a wager, etc. The user may select a set-up option from such a menu that causes the application to display a screen such as screen 46 of FIG. 2.

Screen 46 of FIG. 2 may contain selectable tab options such as tab option 48 (for setting options), tab option 50 (for setting automatic wagering options), and tab option 52 (for setting wagering criteria). When an option such as one of options 48, 50, or 52 is selected, the tab for that option may be displayed on top of the other tabs and the corresponding options associated with that tab are displayed in option region 54.

The options displayed in region 53 of screen 46 provide the user with an opportunity to select which criteria the user would like the application to use to trigger an action in the application when the application identifies a wagering opportunity that satisfies the criteria. Actions that may be taken by the application when the selected criteria are met include issuing a reminder, automatically placing a wager, etc. If desired, the user may select multiple actions to be taken when the criteria are satisfied.

Suitable criteria that may be used to trigger actions include the particular track at which a race is to be run (e.g., Churchill Downs), a particular horse, Jockey, or Trainer. Other suitable criteria include the surface for a race (e.g., turf), the distance of a race, or various race statistics. Criteria may also include the colors of a jockey's silks. If desired, criteria may include odds-based criteria. For example, a criteria may be whether the current odds for a horse have changed from the morning line odds for that horse by more than a certain amount, etc. These criteria are merely illustrative. Any suitable criteria may be used if desired.

The wagering application may determine when the selected criteria have been satisfied by comparing the wagering criteria to the racing data provided to the application. The racing data may be provided by transaction processing and subscription management system 24 or may be otherwise accessed by the wagering application (e.g., by directly accessing the data in communications with totalizators 30, racing data collection and processing system 28, or other such equipment).

Figure 3:
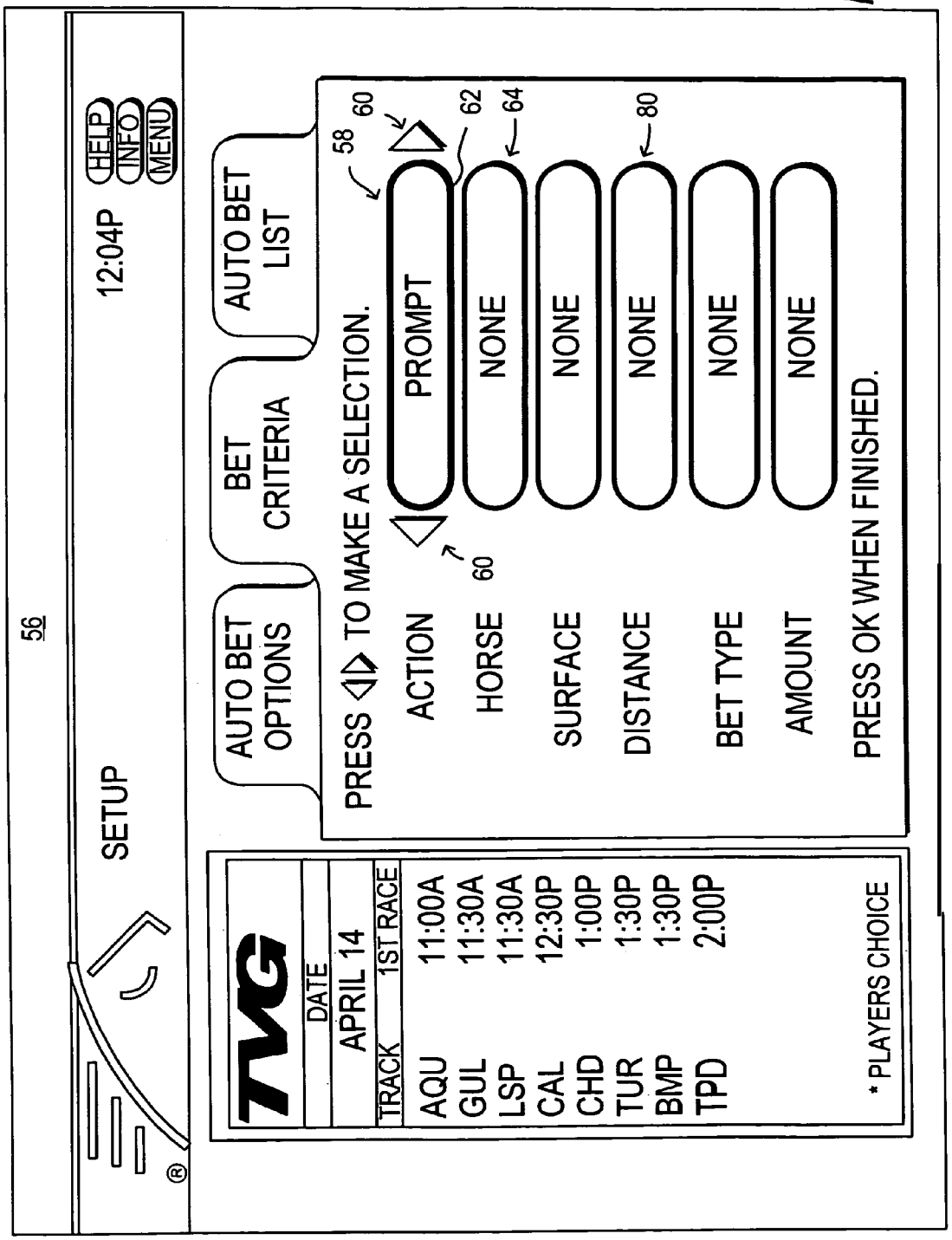
FIG. 3 is an illustrative display screen that the interactive wagering application may display to allow the user to select particular desired wagering criteria in accordance with the present invention.

In the example of FIG. 2, the user has used highlight region 54 to select the criteria "horse," "surface," and "distance." These criteria may be highlighted (as indicated by the letter "H" on each of the selected criteria) by, for example, displaying them in a different color (for example, yellow) then the remaining criteria (which may be displayed, for example, in blue). As shown in FIG. 3, the interactive wagering application may then display a screen such as screen 56 in which the user is provided with an opportunity to fill in the entries for the criteria categories selected in screen 46 of FIG. 2. For example, action option 58 may be provided to allow the user to select which action is to be taken when the wager criteria are met. The user may navigate through the entries for option 58 by pressing right and left remote control arrows. The availability of additional entries for the option may be indicated with arrows 60. A highlight region 62 may be used to select desired options.

Suitable actions that may be taken when the wager criteria are met include displaying a reminder (prompt), alerting the user with an audible reminder, sending a reminder to the user as e-mail, a paging message, a telephone call, etc. E-mail messages may be distributed to users at user computer equipment 20 (FIG. 1), user television equipment 22, a cellular telephone with e-mail capabilities, a handheld computing device or other small portable device with e-mail capabilities, etc. Paging and telephone calls may be handled similarly.

Wagers may be placed automatically when the criteria are satisfied. If desired, the user may be notified when a wager is automatically placed. For example, the user may select an option that directs the system to send an e-mail message is sent to the user whenever the system automatically places a wager based on the criteria selected by the user.

Selecting wagering criteria for certain options such as horse option 64 may involve lists of criteria with entries that are too numerous to easily accommodate with a right/left arrow interface such as used in connection with option 58. Such options may use ancillary screens or other features to assist the user in selecting desired wagering criteria. For example, the number of horses from which a user may select a desired horse or horses to establish as wagering criteria may be too large to list on a single screen. The system may therefore provide a search interface such as the search interface shown in screen 66 of FIG. 4 whenever the user selects an option such as option 64 of FIG. 3.

Figure 4:
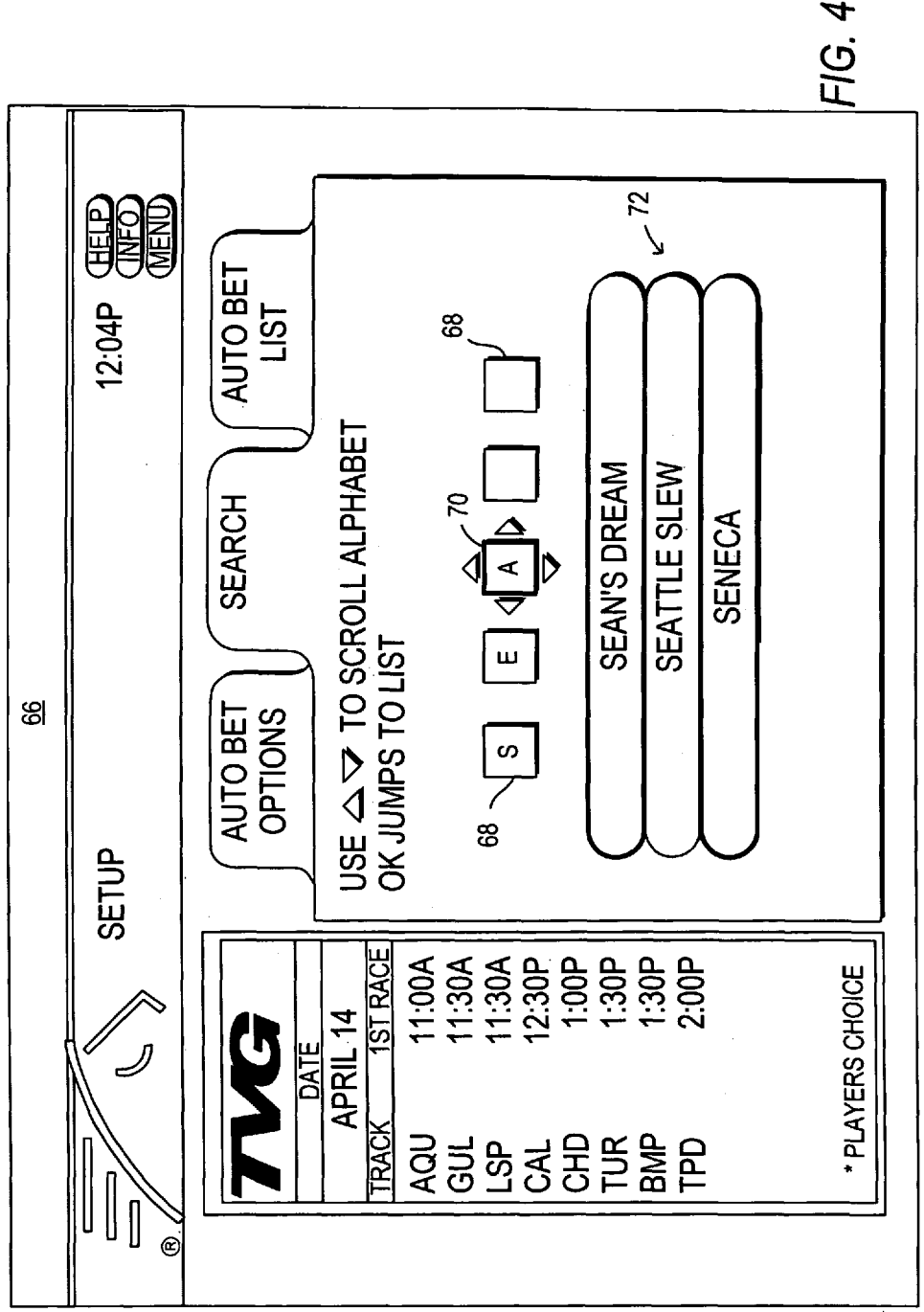
FIG. 4 is an illustrative display screen that the interactive wagering application may display to allow the user to search for a particular horse to use as a wagering criteria in accordance with the present invention.

As shown in FIG. 4, the arrangement of screen 66 provides the user with an opportunity to search for a desired horse by entering at least part of the horse's name. Within any given cell, up and down remote control arrow keys may be used to select a desired letter. Right and left arrow keys may be used to move between cells. Highlight region 70 indicates the user's current position. A list of horse names matching the letters entered by the user may be displayed in region 72. The horse names may be displayed in real time as the user enters letters in the cells or may be displayed after the user initiates a search by entering letters in cells 68 and pressing a remote control OK key.

The arrangement of FIG. 4 is merely illustrative. Any other suitable user interface may be used for character-based searching. For example, an on-screen keyboard may be used in which the letters of the alphabet are displayed in a roughly rectangular grid from which the user may select desired characters using a movable highlight region.

Figure 5:
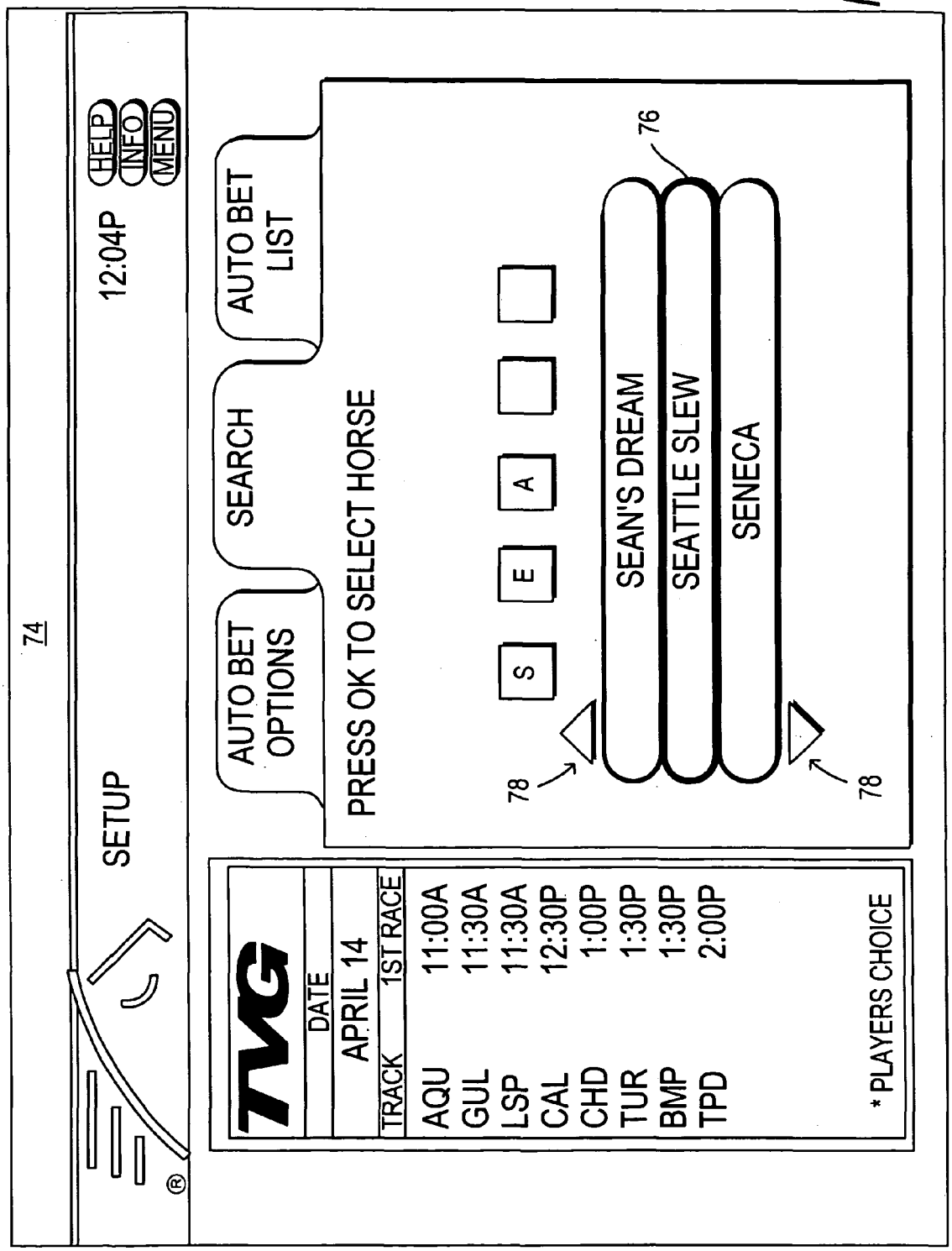
FIG. 5 is an illustrative display screen that the interactive wagering application may display to allow the user to select a desired horse from a list of horses displayed as the results of the search performed using the arrangement of FIG. 4 in accordance with the present invention.
Figure 6:
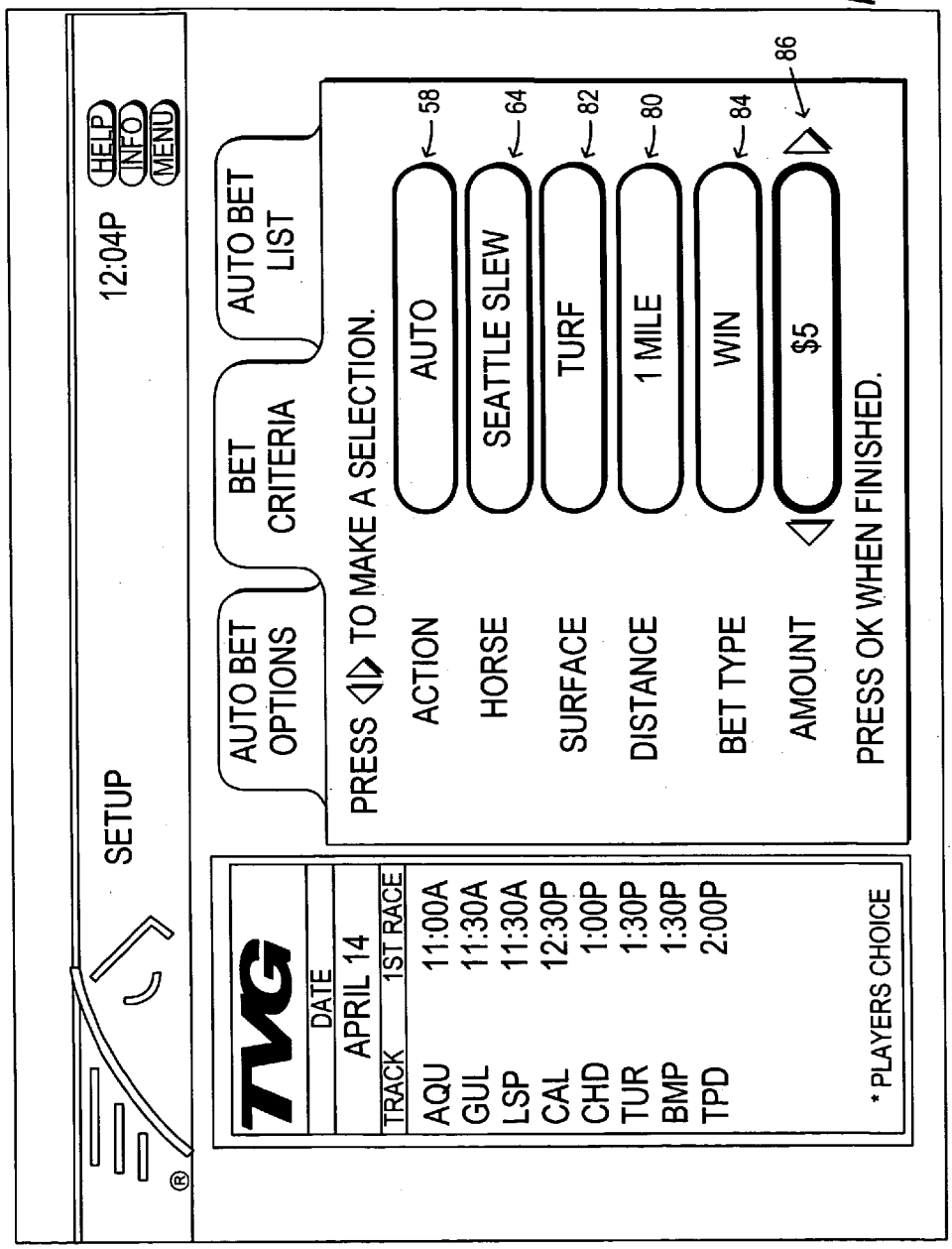
FIG. 6 is an illustrative display screen that the interactive wagering application may display to provide the user with an opportunity to select a wager type and wager amount for the application to use when placing automatic wagers whenever the selected wager criteria have been satisfied in accordance with the present invention.

When the user presses the OK key after selecting desired characters using an arrangement such as the arrangement of FIG. 4, a display screen such as display screen 74 of FIG. 5 may be provided. In display screen 74, highlight region 76 is positioned on top of a horse name that matches the characters selected by the user. The user may scroll up or down through the displayed horse names as indicated by arrows 78. When the user locates a desired horse name, the user may press a remote control OK key to select that horse for horse option 64 of FIG. 3. An illustrative screen on which a horse name has been selected is shown in FIG. 6.

Different user interfaces may be provided to assist the user in selecting different types of wagering criteria. Some criteria, such as the action criteria, may be best selected using an approach in which right and left arrow keys are used to display different possible entries. Other criteria, such as horse names, jockey names, tracks, etc., may be sufficiently extensive that they are best selected using a search feature or other assisted-selection arrangement.

Other criteria may be best selected using still different approaches. For example, when the user desires to select a desired distance criteria using distance option 80 of FIG. 3, the system may display a separate screen in which the available distances are arranged in two columns. The user may select the desired distance using a highlight region. This type of approach may be used whenever it is desired to provide more visual information for the user than the simple right/left arrow key approach in which the user selects from criteria that are displayed on the same line as the option.

These different approaches for selecting wagering criteria are merely illustrative. Any suitable approaches or combinations of such approaches may be used if desired. Such approaches may allow the user to select a single criteria or multiple criteria. Criteria may be combined using any suitable user-selected or default logic. For example, the default provided by the interactive wagering application may be that all criteria must be satisfied before a given action is taken (i.e., AND logic). As an alternative, or in combination with AND logic, OR logic or other suitable logic functions (including NOT functions and non-boolean, weighted logic functions) may be used.

If the user desires to have the wagering application automatically place wagers when the user's selected criteria are matched, the user may select an "auto" setting with action option 58, as shown in FIG. 6. If the selected action is that the system is to automatically place a wager, the user may be provided with an opportunity to select a wager type (using an option such as option 84) and a wager amount (using an option such as option 86). The criteria that are used to trigger the automatic wager may be set using options such as option 64 (used to select a desired horse), option 82 (used to select a desired track surface), and option 80 (used to select a desired race distance).

Limits may be established on the amount of wagers that may be placed using the automatic criteria wagering feature. For example, the wagering application may set default monetary limits of $500.00 in total wagers, $700.00 in losses, or $1000.00 in winnings. Limits may be set in dollar amounts or may be based on the number of wagers placed. The wagering application may set different limits for different users or types of user. Users may also set wagering limits. When the wagering application senses that a limit is about to be exceeded, the user may be notified and provided with an opportunity to authorize further automatic wagering.

An expiration time may be set for automatic wagers. For example, the application or the user may establish a two-week time limit for wagers. No wagers will be placed automatically after two weeks without further authorization. Any suitable time period may be used as a default or user-selected expiration time.

If desired, the wagering application may provide the user with an opportunity to define a time window during which a particular set of wager criteria are valid. For example, the application may allow the user to make wager criteria valid only on Saturdays and Sundays between the hours of 1:00 PM to 4:00 PM. The time window may involve multiple days of the week and multiple time windows during each day.

Figure 7:
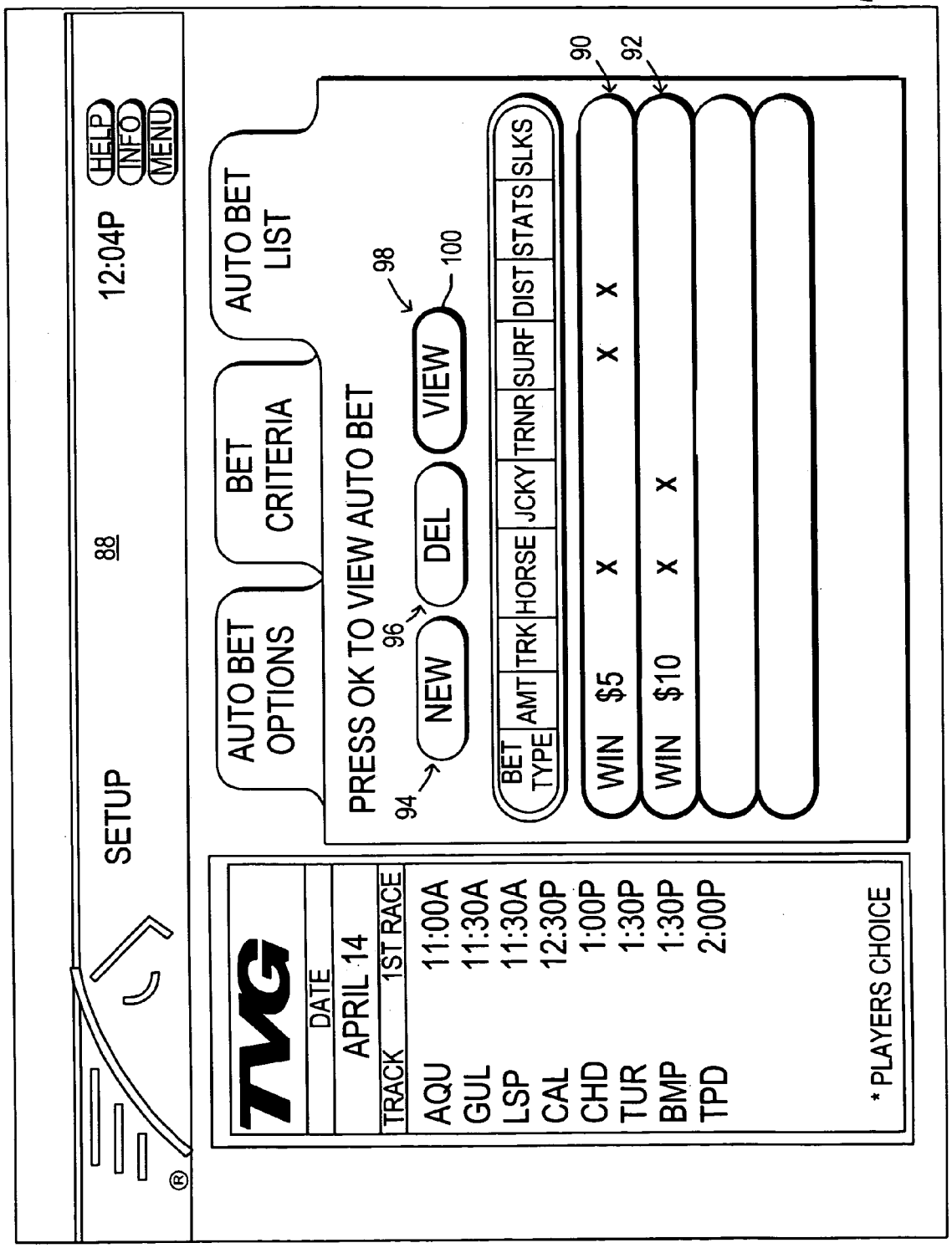
FIG. 7 is an illustrative display screen that the interactive wagering application may display that contains a summary of multiple sets of wagering criteria that the user has selected in accordance with the present invention.

In the example of FIG. 6, the user has selected the wager type "WIN" and the wager amount "$5." When the user presses the OK remote control key, the wagering application may provide the user with a summary of the conditions that have been established for criteria wagering, as shown in FIG. 7. The rows of screen 88 of FIG. 7, each contain information on a different set of automatic wagering criteria. For example, row 90 provides a summary of one set of criteria that have been established (i.e., a particular horse, a particular surface, and a particular distance) that when satisfied result in the automatic placing of a $5 win wager. Row 92 provides a summary of another set of wagering criteria. When the criteria of row 92 have been satisfied, the wagering application may automatically place a $10 win wager.

Screen 88 may contain options such as new option 94 (to create a new set of wagering criteria), delete option 96 (to delete one of the rows of wagering criteria), and view option 98 (to view additional information on a set of wagering criteria). The user may select one of these options using movable highlight region 100. If the user selects delete option 96 or view option 98, the wagering application may place a movable highlight region on top of one of the rows in FIG. 7. The user may use the highlight region to select a desired row to delete or to select a desired row for which it is desired to view additional information.

Figure 8:
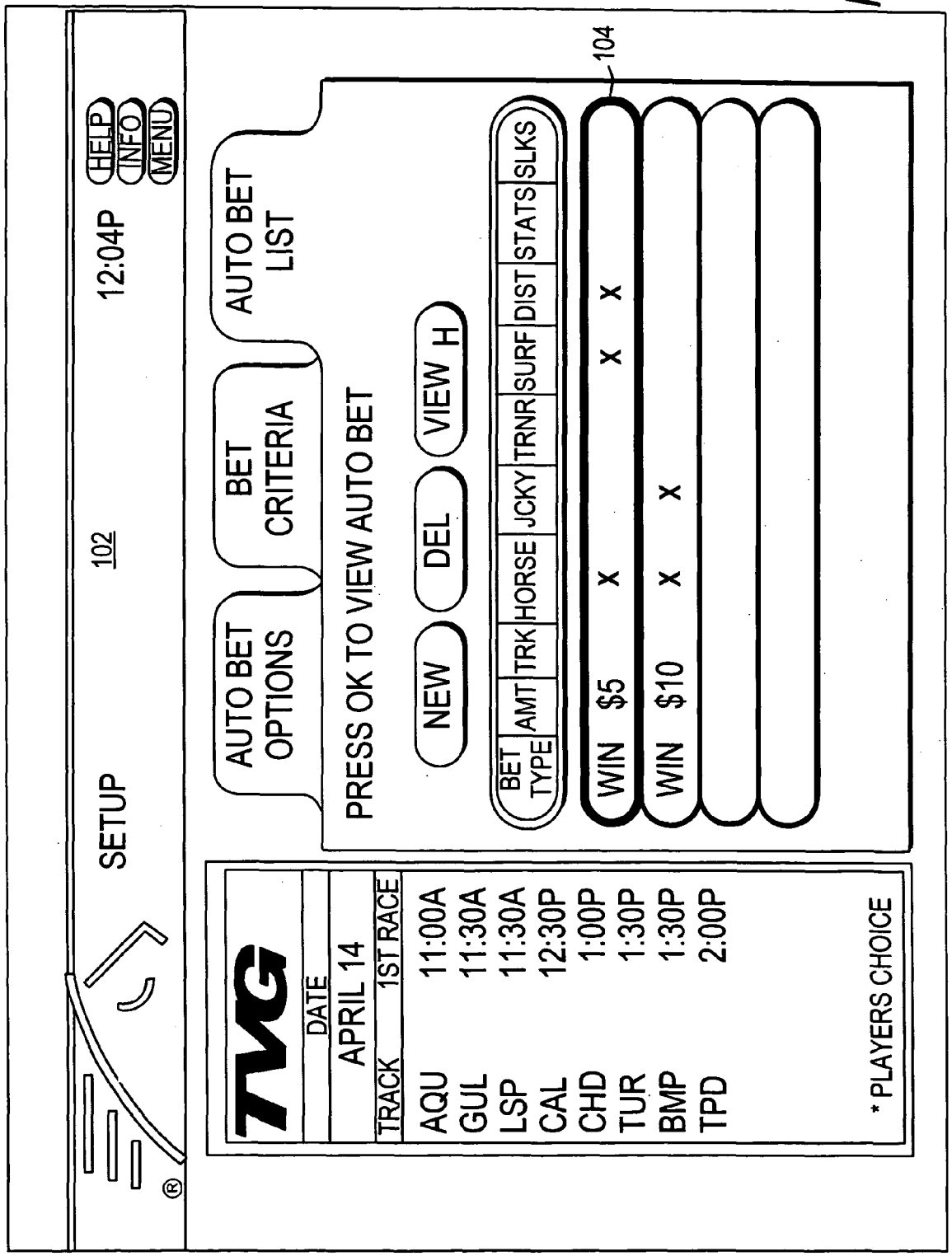
FIG. 8 shows how the user may select a desired set of wagering criteria from the screen of FIG. 7 using a movable highlight region in accordance with the present invention.

As shown in FIG. 8, if the user selects view option 98 of FIG. 7, the wagering application may provide a display screen such as screen 102 in which the view option is highlighted (as indicated by the "H") by, e.g., being displayed in a color such as yellow that is different than the color in which the remaining options are displayed (e.g., blue). Highlight region 104 of FIG. 8 may be used to select a row. A screen such as screen 106 of FIG. 9 may be displayed when the user selects one of the rows in screen 102 of FIG. 8. In screen 106 of FIG. 9, a wagering criteria details region 108 is displayed as an overlay on top of the contents of screen 102 of FIG. 8. Wagering criteria details region 108 may contain more detailed information on the wagering criteria, the wager type, and the wager amount that are associated with the row that was selected in screen 102 of FIG. 8. Wagering criteria details region 108 may contain, for example, information on the name of the horse that was selected and the type of surface. If desired, the information displayed in region 110 of wagering criteria region 108 may be scrolled (e.g., using up and down arrow keys). The user may cancel the presentation of the wagering criteria details region 108 (the overlay) by pressing the OK remote control key.

Figure 9:
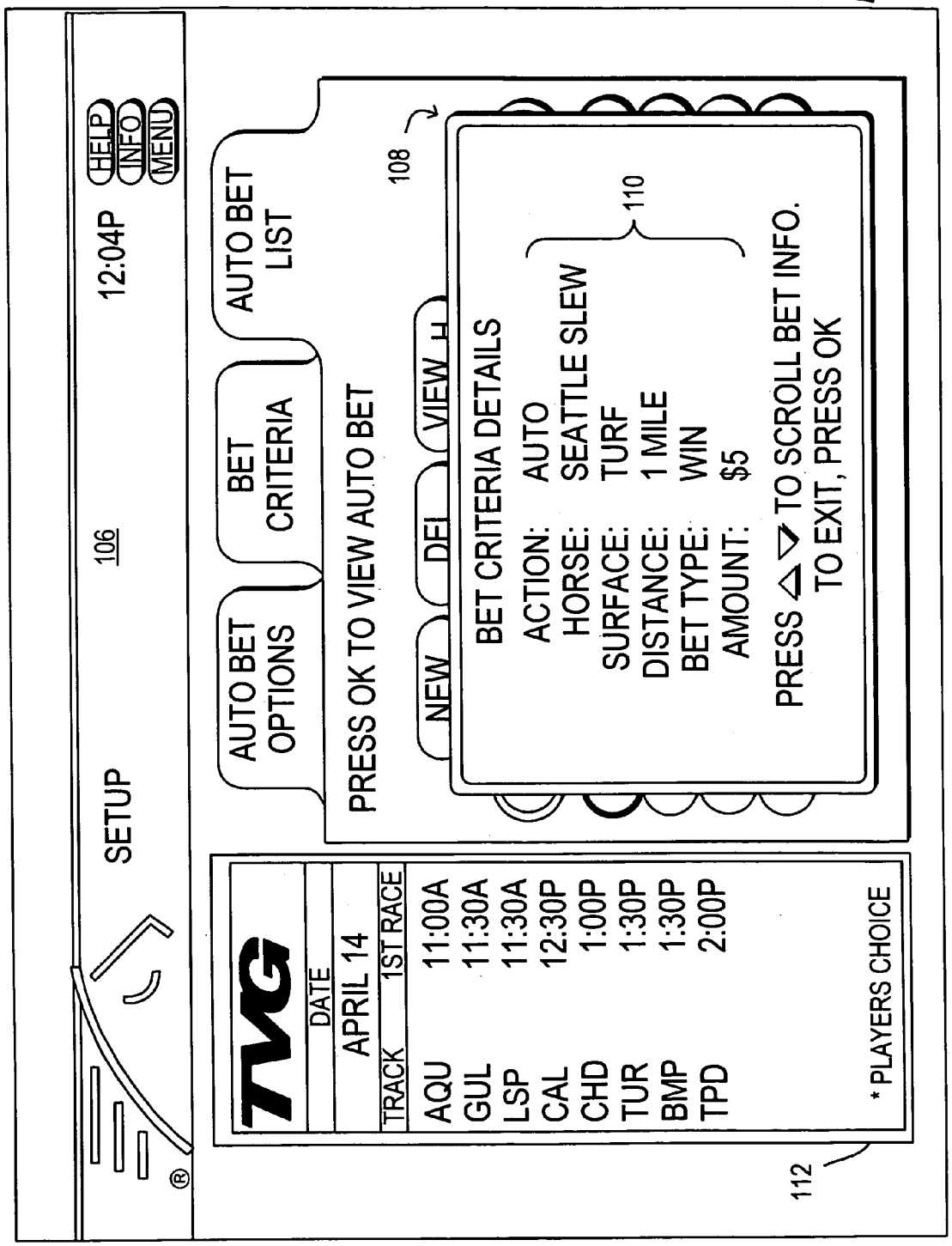
FIG. 9 is an illustrative display screen showing how wager criteria details may be displayed as a partial-screen overlay on top of an existing display screen provided by the interactive wagering application.

Region 112 of screen 106 of FIG. 9 (and other screens such as the screens of FIGS. 2-8) may be used to display racing-related information. For example, region 112 may be used to display information on the scheduled race times for the first race at various tracks. A region such as region 112 may also be used to display a "ticket" that includes information on the wagering criteria that the user has selected for criteria-based wagering (i.e., automatic wagering, wager notifications, and the like). If desired, region 112 may be used to display advertisements or to provide other services (e.g., information services, services related to ordering products or services, etc.).

Figure 10:
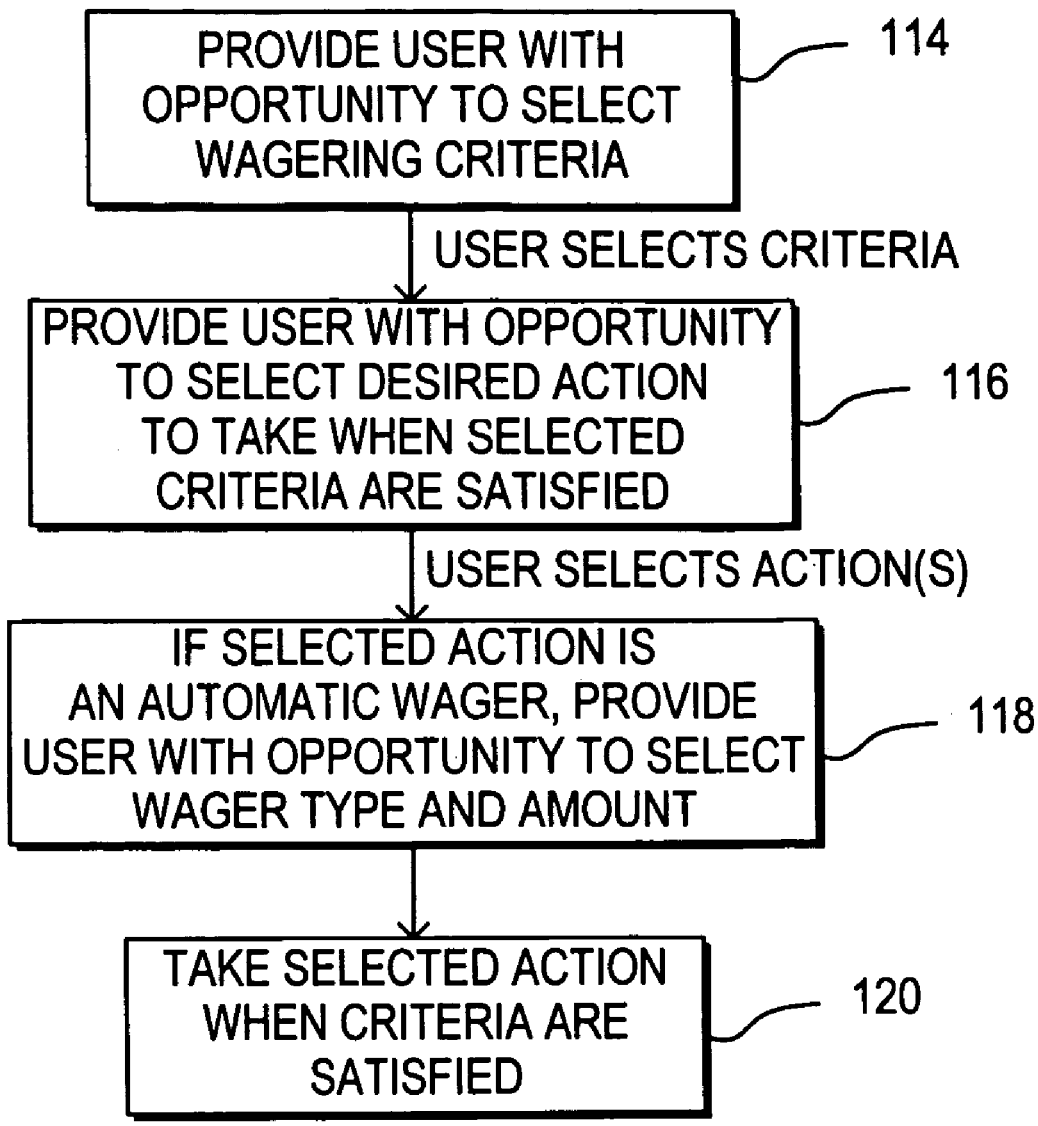
FIG. 10 is a flow chart of illustrative steps involved in using the wagering criteria features of the interactive wagering application in accordance with the present invention.

Illustrative steps involved in using system 10 (FIG. 1) to provide an interactive wagering service with criteria wagering capabilities are shown in FIG. 10. At step 114, the wagering application may provide the user with an opportunity to select wagering criteria. For example, the wagering application may provide on-screen options that allow the user to select desired wagering criteria from various lists or groups of criteria. Search capabilities may be provided to facilitate the searching for criteria of interest when there are many possible selections to be made (e.g., when selecting a desired horse name, jockey name, racetrack, etc.). Criteria may also be selected using other suitable input interfaces such as voice recognition systems, interactive voice response systems, interfaces using pointing devices such as trackballs, mice, touch pads, etc. Any other suitable arrangement or a combination of these arrangements may be used if desired.

The wagering criteria that may be selected may be any suitable racing-related characteristics, such as horse name, racetrack surface, jockey name, trainer name, racetrack surface, racetrack distance, statistics, silks (i.e., the colors worn by the jockey for a particular horse), etc. These are merely illustrative examples, any suitable type of race-related or wagering-related information may be used as wagering criteria if desired.

After the user has selected certain wagering criteria at step 114, the wagering application may provide the user with an opportunity at step 116 to direct the application to place wagers automatically, to notify the user when the criteria have been satisfied, to both place a wager and notify the user, or to perform any other suitable action or combination of such actions. Automatic wagers may be placed using transaction processing and subscription management system 24 (FIG. 1). Confirmations may be provided for each wager. For example, an e-mail message or the like may be provided to the user. The e-mail message may contain information on the placed wager such as the horse, racetrack, jockey, wager type, wager amount, etc.

The user may be notified when the criteria are satisfied using an on-screen prompt (e.g., a pop-up overlay that is displayed over a television program that the user is watching or other information that is currently being displayed). The user may also be notified when the criteria are satisfied by alerting the user with an audible reminder. The user may be notified by sending a reminder to the user as e-mail, a paging message, or other suitable electronic message. Transaction processing and subscription management system 24 may notify the user that the criteria have been satisfied by placing a telephone call to the user. Notifications may be distributed to users at user computer equipment 20 (FIG. 1), user television equipment 22, or user telephone equipment 32. For example, e-mail notifications may be provided to users with a cellular telephone with e-mail capabilities, a handheld computing device or other small portable device with e-mail capabilities, etc. Paging messages and telephone calls may be handled similarly.

If desired, notifications may be provided to users with a different platform than the platform that is used to establish the wagering criteria. For example, the user may provide the wagering application with the wagering criteria by pressing touch tone telephone buttons in response to audible prompts from interactive voice response equipment at transaction processing and subscription management system 24 (FIG. 1). The user may be notified when the criteria have been satisfied using an e-mail message to the user's personal computer at work or an electronic message sent to the user's handheld computing device. These are merely illustrative examples of suitable arrangements for notifying the user when the wagering criteria have been satisfied. Any suitable notification arrangement may be used. If desired, when certain wagering criteria are satisfied the wagering application may both place an automatic wager and notify the user.

If the action selected at step 116 is an automatic wager, the wagering application may provide the user with an opportunity to specify a desired wager type and desired wager amount at step 118.

The selected action may be taken at step 120. For example, a wager may be automatically placed, the user may be notified that a wagering opportunity has arisen that satisfies the selected wagering criteria, etc. Certain notifications may be made using software (e.g., software that is part of the wagering application) that is running at least partially on the user's local system (e.g., user television equipment 22, user computer equipment 20, or user telephone equipment 32). For example, a pop-up menu or audible alert may be automatically generated at the user's location when the wagering application detects that the user's wagering criteria have been satisfied. Other notifications may be made using software that is running remotely. For example, e-mail notifications, paging notifications, and telephone call notifications may be generated at transaction processing and subscription management system 24 or other suitable remote facility. If desired, a combination of local and remote techniques may be used to provide notification and automatic wagering functions.

The foregoing is merely illustrative of the principles of this invention and various modifications can be made by those skilled in the art without departing from the scope and spirit of the invention.

What is claimed is:

1. A method for a user at user equipment to interactively wager on races to be run with an interactive wagering with an interactive wagering application implemented using the user equipment, comprising:

allowing the user at the user equipment to use the interactive wagering application to select desired wagering criteria;

receiving racing data at the user equipment about a plurality of races to be run;

determining with the user equipment whether a desired wagering opportunity exists by comparing at least a portion of the received racing data to the wagering criteria; and using the interactive wagering application implemented using the user equipment to automatically take a particular action in response to determining that a desired wagering opportunity exists, wherein the particular action comprises at least providing a notification to the user that the desired wagering opportunity exists.

2. The method defined in claim 1 further comprising using the interactive wagering application to provide the user with an opportunity to select which particular action is taken whenever the wagering criteria are satisfied.

3. The method defined in claim 1 wherein the interactive wagering application is implemented using user television equipment, the method further comprising using the interactive wagering application implemented on the user television equipment to determine whether the wagering criteria are satisfied.

4. The method defined in claim 1 further comprising using the interactive wagering application to provide the user with an opportunity to select a particular racetrack as one of the wagering criteria.

5. The method defined in claim 1 further comprising using the interactive wagering application to provide the user with an opportunity to select a particular horse as one of the wagering criteria.

6. The method defined in claim 1 further comprising using the interactive wagering application to provide the user with an opportunity to select a particular horse as one of the wagering criteria by searching for a desired horse with an on-screen user interface that allows the user to enter a search character string with a remote control.

7. The method defined in claim 1 further comprising using the interactive wagering application to provide the user with an opportunity to select a particular jockey as one of the wagering criteria.

8. The method defined in claim 1 further comprising using the interactive wagering application to provide the user with an opportunity to select a particular trainer as one of the wagering criteria.

9. The method defined in claim 1 further comprising using the interactive wagering application to provide the user with an opportunity to select a particular track surface as one of the wagering criteria.

10. The method defined in claim 1 further comprising using the interactive wagering application to provide the user with an opportunity to select a particular race distance as one of the wagering criteria.

11. The method defined in claim 1 further comprising using the interactive wagering application to provide the user with an opportunity to select a particular racing statistic as one of the wagering criteria.

12. The method defined in claim 1 further comprising using the interactive wagering application to provide the user with an opportunity to select a particular silk color as one of the wagering criteria.

13. The method defined in claim 1 further comprising using the interactive wagering application to provide the user with an opportunity to select a particular amount by which the odds for a horse change from that horse's morning line odds as one of the wagering criteria.

14. The method defined in claim 1 further comprising providing the user with an opportunity to select whether the action taken involves the automatic placing of a wager whenever the wagering criteria are satisfied.

15. The method defined in claim 1 wherein the action taken involves the automatic placing of a wager whenever the wagering criteria are satisfied, the method further comprising providing the user with an opportunity to select a wager amount and wager type associated with the wagering criteria prior to the automatic placing of the wager.

16. The method defined in claim 1 wherein there are multiple sets of wagering criteria established by the user each with an associated action to be taken when that set of wagering criteria is satisfied, the method further comprising providing the user with an opportunity to select a different wager amount and wager type for each of the multiple sets of wagering criteria.

17. The method defined in claim 1 further comprising providing different user interfaces with the wagering application for selecting different types of wagering criteria.

18. The method defined in claim 1 wherein the action taken involves notification of the user at a set-top box connected to a television, the method further comprising notifying the user by displaying a partial-screen overlay message on top of a screen currently being displayed on the television.

19. The method defined in claim 1 wherein the action taken involves notification of the user, the method further comprising notifying the user that the wagering criteria have been satisfied using an e-mail message.

20. The method defined in claim 1 wherein the action taken involves notification of the user, the method further comprising notifying the user that the wagering criteria have been satisfied using a wireless message.

21. The method defined in claim 1 wherein the action taken involves notification of the user at a set-top box connected to a television, the method further comprising notifying the user that the wagering criteria have been satisfied by displaying a message on the television.

22. The method defined in claim 1 further comprising using the wagering application to provide a display screen containing a summary of which types of wagering criteria have been established.

23. The method defined in claim 1 further comprising using the wagering application to provide a display screen containing a summary of which types of wagering criteria have been established, wherein the summary includes information on wager amounts and wager types that the user has established for use whenever various sets of wagering criteria are satisfied.

24. The method defined in claim 1 further comprising:
using the wagering application to provide a display screen containing a summary of which types of wagering criteria have been established, wherein the summary includes information on wager amounts and wager types that the user has established for use whenever various sets of wagering criteria are satisfied; and
displaying wagering criteria details for a given one of the sets of wagering criteria when the user selects that set from the summary.

25. The method defined in claim 1 further comprising using the wagering application to limit automatic wagering based on monetary wagering limits.

26. The method defined in claim 1 further comprising:
providing the user with an opportunity to select a desired monetary wagering limit; and
using the wagering application to limit automatic wagering based on the monetary wagering limit.

27. The method defined in claim 1 further comprising using the wagering application to provide the user with an opportunity to select an expiration time for automatic wagering.

28. A method for interactive wagering on horse races to be run with an interactive wagering application implemented using a set-top box connected to a television and a user input device, comprising:
providing a user with an opportunity to select a given horse using the user input device;
receiving racing data at the set-top box about a plurality of races to be run;
determining with the set-top box if the given horse is to run in at least one race by comparing at least a portion of the received racing data to an identification of the given horse; and
automatically providing a notification to the user at the set-top box that the horse is to run in the at least one race and placing a wager for the given horse in response to determining that the given horse is to run in the at least one race.

29. The method defined in claim 28 further comprising providing the user with an opportunity to select the amount of the wager and the wager type with the interactive wagering application.

30. The method defined in claim 28 further comprising:
providing the user with an opportunity to select multiple horses using the wagering application; and
automatically placing wagers for each horse when it is determined that the horse is to run in a particular race.

31. An interactive wagering system in which an interactive wagering application is used to provide a user with an opportunity to place wagers on races to be run, comprising:
user television equipment configured to:
provide the user with an opportunity to select a given horse using the interactive wagering application;
receive racing data about a plurality of races to be run;
determine if the given horse is to run in at least one race by comparing at least a portion of the received racing data to an identification of the given horse; and
automatically provide a notification to the user that the horse is to run in the at least one race and place a wager for the given horse in response to determining that the given horse is to run in the at least one race; and
a transaction processing and subscription management system that handles the automatically placed wager.

32. The interactive wagering system defined in claim 31 further comprising user computer equipment separate from the user television equipment, wherein the interactive wagering application notifies the user at the user computer equipment by e-mail when the automatic wager has been placed.

33. A non-transitory computer-readable medium for use in an interactive wagering system, the non-transitory computer-readable medium comprising computer-readable instructions recorded thereon that, when executed, cause the non-transitory computer-readable medium to implement the method comprising:

allowing a user to select desired wagering criteria;
receiving racing data about a plurality of races to be run;
determining whether a desired wagering opportunity exists by comparing at least a portion of the received racing data to the wagering criteria; and
automatically taking a particular action in response to determining that a desired wagering opportunity exists, wherein the particular action comprises at least providing a notification to the user that the desired wagering opportunity exists.

34. The computer-readable medium defined in claim 33 further comprising computer-readable instructions recorded thereon for providing the user with an opportunity to select which particular action is taken whenever the wagering criteria are satisfied.

35. The computer-readable medium defined in claim 33 wherein the computer-readable medium is used with user television equipment.

36. The computer-readable medium defined in claim 33 further comprising computer-readable instructions recorded thereon for providing the user with an opportunity to select a particular racetrack as one of the wagering criteria.

37. The computer-readable medium defined in claim 33 further comprising computer-readable instructions recorded thereon for providing the user with an opportunity to select a particular horse as one of the wagering criteria.

38. The computer-readable medium defined in claim 33 further comprising computer-readable instructions recorded thereon for providing the user with an opportunity to select a particular horse as one of the wagering criteria by searching for a desired horse with an on-screen user interface that allows the user to enter a search character string with a remote control.

39. The computer-readable medium defined in claim 33 further comprising computer-readable instructions recorded thereon for providing the user with an opportunity to select a particular jockey as one of the wagering criteria.

40. The mage computer-readable medium defined in claim 33 further comprising computer-readable instructions recorded thereon for providing the user with an opportunity to select a particular trainer as one of the wagering criteria.

41. The computer-readable medium defined in claim 33 further comprising computer-readable instructions recorded thereon for providing the user with an opportunity to select a particular track surface as one of the wagering criteria.

42. The computer-readable medium defined in claim 33 further comprising computer-readable instructions recorded thereon for providing the user with an opportunity to select a particular race distance as one of the wagering criteria.

43. The computer-readable medium defined in claim 33 further comprising computer-readable instructions recorded thereon for providing the user with an opportunity to select a particular racing statistic as one of the wagering criteria.

44. The computer-readable medium defined in claim 33 further comprising computer-readable instructions recorded thereon for providing the user with an opportunity to select a particular silk color as one of the wagering criteria.

45. The computer-readable medium defined in claim 33 further comprising computer-readable instructions recorded thereon for providing the user with an opportunity to select a particular amount by which the odds for a horse change from that horse's morning line odds as one of the wagering criteria.

46. The computer-readable medium defined in claim 33 further comprising computer-readable instructions recorded thereon for providing the user with an opportunity to select whether the action taken involves the automatic placing of a wager whenever the wagering criteria are satisfied.

47. The computer-readable medium defined in claim 33 wherein the action taken involves the automatic placing of a wager whenever the wagering criteria are satisfied, the computer-readable medium further comprising machine-readable instructions recorded thereon for providing the user with an opportunity to select a wager amount and wager type associated with the wagering criteria prior to the automatic placing of the wager.

48. The computer-readable medium defined in claim 33 wherein there are multiple sets of wagering criteria established by the user each with an associated action to be taken when that set of wagering criteria is satisfied, the computer-readable medium further comprising computer-readable instructions recorded thereon for providing the user with an opportunity to select a different wager amount and wager type for each of the multiple sets of wagering criteria.

49. The computer-readable medium defined in claim 33 further comprising computer-readable instructions recorded thereon for providing different user interfaces for selecting different types of wagering criteria.

50. The computer-readable medium defined in claim 33 wherein the action taken involves notification of the user at a set-top box connected to a television, the computer-readable medium further comprising machine-readable instructions recorded thereon for notifying the user by displaying a partial-screen overlay message on top of a screen currently being displayed on the television.

51. The computer-readable medium defined in claim 33 wherein the action taken involves notification of the user, the machine-readable medium further comprising computer-readable instructions recorded thereon for notifying the user that the wagering criteria have been satisfied using an e-mail message.

52. The computer-readable medium defined in claim 33 wherein the action taken involves notification of the user, the computer-readable medium further comprising machine-readable instructions recorded thereon for notifying the user that the wagering criteria have been satisfied using a wireless message.

53. The computer-readable medium defined in claim 33 wherein the action taken involves notification of the user at a set-top box connected to a television, the computer-readable medium further comprising machine-readable instructions recorded thereon for notifying the user that the wagering criteria have been satisfied by displaying a message on the television.

54. The computer-readable medium defined in claim 33 further comprising computer-readable instructions recorded thereon for providing a display screen containing a summary of which types of wagering criteria have been established.

55. The computer-readable medium defined in claim 33 further comprising computer-readable instructions recorded thereon for providing a display screen containing a summary of which types of wagering criteria have been established, wherein the summary includes information on wager amounts and wager types that the user has established for use whenever various sets of wagering criteria are satisfied.

56. The computer-readable medium defined in claim 33 further comprising computer-readable instructions recorded thereon for:
providing a display screen containing a summary of which types of wagering criteria have been established, wherein the summary includes information on wager amounts and wager types that the user has established for use whenever various sets of wagering criteria are satisfied; and displaying wagering criteria details for a given one of the sets of wagering criteria when the user selects that set from the summary.

57. The computer-readable medium defined in claim 33 further comprising computer-readable instructions recorded thereon for limiting automatic wagering based on monetary wagering limits.

58. The computer-readable medium defined in claim 33 further comprising computer-readable instructions recorded thereon for:
  providing the user with an opportunity to select a desired monetary wagering limit; and
  limiting automatic wagering based on the monetary wagering limit.

59. The computer-readable medium defined in claim 33 further comprising computer-readable instructions recorded thereon for providing the user with an opportunity to select an expiration time for automatic wagering.

60. The method of claim 1 further comprising allowing the user to place a wager on the desired wagering opportunity in response to providing the notification.

61. The method of claim 1 wherein providing a notification to the user that the desired wagering opportunity exists comprises automatically providing the notification at substantially the same time that it is determined that the desired wagering opportunity exists.

62. The method of claim 28 wherein providing a notification to the user that the horse is to run comprises automatically providing the notification at substantially the same time that it is determined that the given horse is to run in the at least one race.

63. The interactive wagering system of claim 31 wherein the user television equipment is configured to provide the notification to the user that the horse is to run at substantially the same time that it is determined that the given horse is to run in the at least one race.

64. The computer-readable medium of claim 33 further comprising computer-readable instructions recorded thereon for allowing the user to place a wager on the desired wagering opportunity in response to providing the notification.

65. The computer-readable medium of claim 33 further comprising computer-readable instructions recorded thereon for automatically providing the notification at substantially the same time that it is determined that the desired wagering opportunity exists.

* * * * *